Feb. 25, 1936.  J. W. LOGAN, JR  2,032,178
RETARDATION CONTROLLER
Filed Dec. 21, 1934
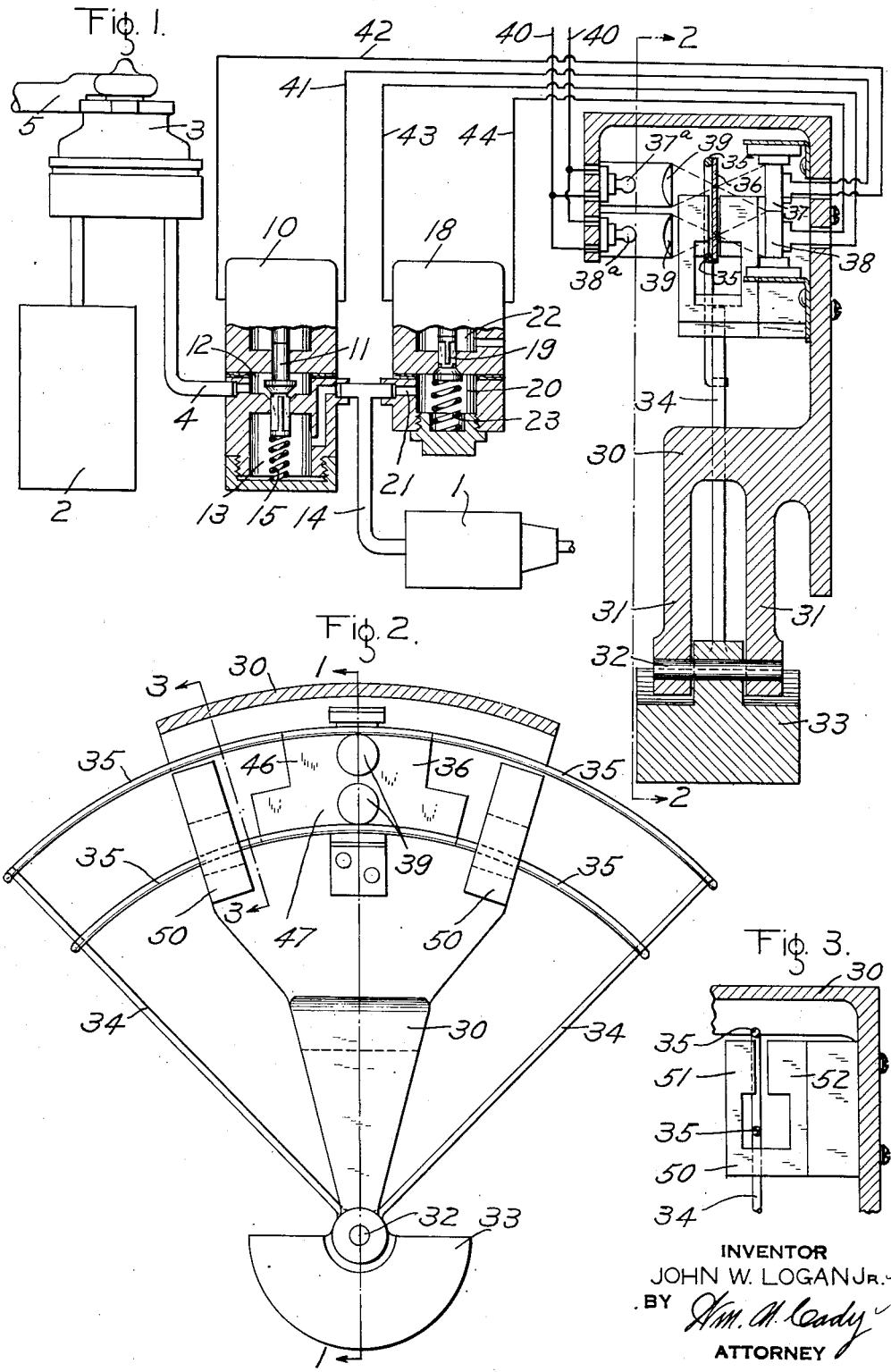
INVENTOR
JOHN W. LOGAN Jr.
BY Wm. A. Cady
ATTORNEY Patented Feb. 25, 1936

2,032,178

UNITED STATES PATENT OFFICE 2,032,178

RETARDATION CONTROLLER

John W. Logan, Jr., Edgewood, Pa., assignor to The Westinghouse Air Brake Company, Wilmerding, Pa., a corporation of Pennsylvania Application December 21, 1934, Serial No. 758,583

24 Claims. (Cl. 303—24)

This invention relates to vehicle brakes and more particularly to fluid pressure brake control apparatus for regulating the braking pressure in accordance with a desired rate of retardation.

It is a fact well known to those skilled in the art that when a friction brake is applied with a given pressure the braking effect produced is less at high vehicle speeds than at low speeds due to the coefficient of friction between friction brake parts being less at high speeds than at low speeds. If the braking pressure be such that a maximum braking effect is obtained at a high speed then the braking pressure must be diminished as the speed of the vehicle diminishes in order to avoid sliding of the wheels. Various devices have been developed for automatically decreasing the braking pressure as the speed of the vehicle decreases but these have not been entirely satisfactory.

It is an object of this invention, therefore, to provide improved means to control the rate of retardation of a vehicle, which means is responsive very rapidly to changes in the rate of retardation of the vehicle.

Another object of the invention is to provide an inertia type of retardation controller, and which employs a pendulum element oscillatable on a small radius whereby the pendulum is very sensitive to changes in the rate of deceleration of the vehicle.

A further object of the invention is to provide an inertia type of retardation controller having an inertia responsive element which moves freely in response to changes in the rate of deceleration of the vehicle, and which has means associated therewith and adapted to control or restrict undesired movement of the inertia responsive element, particularly when this element is in its critical or control position.

A further object of the invention is to provide an inertia responsive type of retardation controller, and having means to control or restrict undesired movement of the inertia responsive element when this element is in its critical or control position, this means being operable instantaneously on movement of the inertia responsive element to its critical or control position.

A further object of the invention is to provide a retardation control device of the inertia responsive type, and in which the inertia responsive element is relieved of all mechanical work, whereby the inertia responsive element is freely movable and is extremely sensitive to changes in the speed of the vehicle.

A further object of the invention is to provide a retardation controller of the inertia responsive type and having means to control or restrict the movement of the inertia responsive element, said means being operable only when the inertia responsive element is in its critical or control position, whereby movement of the inertia responsive element at other points in its range of movement is unrestricted and unimpeded.

Another object of the invention is to provide a retardation controller of the inertia responsive type and having means to control or restrict movement of the inertia responsive element, the force exerted on this element by said means increasing in magnitude the greater the distance which the inertia responsive element moves from its normal position.

Other objects of the invention and features of novelty will be apparent from the following description taken in connection with the accompanying drawing, in which Figure 1 is a diagrammatic view of one form of circuits and apparatus embodying my invention, portions of the apparatus being broken away and shown in section in order to more clearly reveal other parts, the view of the inertia responsive means employed being taken substantially along the line 1—1 of Figure 2.

Figure 2 is a view taken substantially along the line 2—2 of Figure 1, and

Figure 3 is a fragmentary sectional view taken substantially along the line 3—3 of Figure 2.

Referring to the drawing, and more particularly to Figure 1 thereof, the numeral 1 indicates the brake cylinder of a fluid pressure brake which is supplied with fluid under pressure from the reservoir 2 by operation of the brake valve 3 upon movement of the brake valve handle 5 to an application position in a well known manner. Fluid under pressure is supplied to the brake cylinder 1 through the brake cylinder pipe 4 while a cut-off magnet valve device 10 is interposed in the brake cylinder pipe 4 between the brake valve 3 and the brake cylinder 1 and is provided with a valve element 11 which controls communication between the inlet chamber 12 leading from the brake cylinder pipe 4 and the outlet chamber 13 to which is connected a pipe or passage 14 leading to the brake cylinder. The valve element 11 is normally biased to its upper or open position by means of the spring 15 and is moved to its lower or closed position upon energization of the winding (not shown). A release magnet valve device 18 is associated with the pipe 14 leading to the brake cylinder and controls the release of fluid under pressure from the brake cylinder. As shown in the drawing the release magnet valve device 18 has a valve element 19 which controls communication between the inlet chamber 20 which communicates with the pipe or passage 14 through the passage 21 and the exhaust chamber 22, which communicates with the atmosphere. The valve element 19 is normally biased to its upper or closed position by the spring 23 and is moved to its lower or open position so as to permit fluid to flow from the chamber 20 to the chamber 22 and therefrom to the atmosphere upon energization of the winding of the magnet valve device.

The retardation controller provided by my invention has means to automatically control the operation of the magnet valve devices 10 and 18 and this means will now be described. As shown in the drawing the retardation control device has a frame-work indicated generally by the reference character 30, and which may be constructed of any suitable material such as aluminum, and has, adjacent its lower extremity, a pair of arms 31 adapted to support a pin 32 on which is mounted the inertia responsive member or pendulum 33. The inertia responsive member or pendulum 33 is preferably of relative large mass and has its center of gravity located adjacent to the pin 32 so that it is oscillatable upon a relatively short radius. Secured to the pendulum member 33 in any desired manner are a pair of generally radially extending arms 34 between which extend arcuate supporting members 35 which preferably are substantially concentric and are parts of a circle having a center substantially at the axis on which the pendulum is oscillatable. A plate indicated at 36 is secured to the supporting members 35 at a point substantially intermediate the arms 34, and, as will be understood, the plate 36 will be oscillated as a result of movement of the pendulum or inertia responsive element 33.

The frame 30 also has mounted thereon a pair of light responsive elements 37 and 38, which may be of any suitable construction, and light producing elements 37a and 38a, the light responsive elements each being in alignment with a light producing element so as to have impinged thereon a light beam produced by the latter element. The characteristic of the light responsive elements 37 and 38 of importance is that each of these elements will produce an electric current when a beam of light is impinged thereon, but when the beam of light is interrupted or its intensity is substantially reduced, the current produced by these elements will immediately diminish substantially to zero or to a low ineffective value. The light producing elements 37a and 38a have suitable lenses 39 associated therewith to focus the light beams produced thereby so that the focal points of the light beams are located in a plane intermediate the light producing elements and the light responsive elements, the plane of these focal points being substantially the plane in which the member 36 is movable. The light producing elements 37a and 38a may be energized by current supplied from any suitable source by means of the wires 40.

The plate 36 which is carried by the supporting members 35 is constructed of any suitable light interrupting material and normally interrupts the beam of light which is supplied by the light producing elements. On movement of the pendulum or inertia responsive member 33, the plate 36 is moved out of the path of the beams of light supplied by the light producing elements, thereby permitting the light beams to impinge upon the light responsive elements.

The light responsive element 37 is connected to the winding of the cut-off magnet valve 10 through the wires 41 and 42 while the light responsive element 38 is connected to the winding of the release magnet valve 18 by wires 43 and 44.

As will be seen in the drawing the plate 36 is provided with portions of different circumferential widths, the portion adjacent the radially outer side thereof, and indicated by the reference character 46, being somewhat narrower circumferentially than the portion adjacent the radially inner portion thereof and indicated by the reference character 47. The radially outer portion 46 of the plate 36 is adapted to extend into the plane of the beam of light supplied by the light producing element 37a to the light responsive element 37, which controls the winding of the cut-off magnet valve 10, while the radially inwardly disposed portion 47 of the plate 36 is adapted to intercept the light beam supplied by the light producing element 38a which supplies the light to the light responsive element 38 which controls the release magnet valve 18. Because of the smaller width of the portion 46, this portion is moved out of the path of the beam of light supplied by the light producing element 37a in response to a smaller amount of movement of the pendulum 33 than is required to move the portion 47 from the path of the beam of light supplied by the light producing element 38a.

In operation the retardation control device is arranged on the vehicle so that the inertia responsive member 33 is movable in a plane extending substantially longitudinally of the vehicle. When it is desired to effect an application of the brakes, air is admitted to the brake cylinder 1 from the reservoir 2 by movement of the handle 5 of the brake valve device 3. As the vehicle decelerates due to the application of the brakes the force of inertia causes the pendulum or inertia responsive member 33 to move to the front of the vehicle, thereby moving the arms 34 which carry the plate 36. After a certain amount of movement of the pendulum 33 the plate 36 will be moved to a point at which the radially outer portion 46 of the plate 36 no longer interrupts the light supplied from the light producing element 37a. The beam of light therefore impinges upon the light responsive element 37, and because of the characteristics of the light responsive element 37, current flows to the magnet valve device 10 to energize this device to close the valve to cut off the flow of fluid under pressure to the brake cylinder. If, however, this is insufficient to check the rate of retardation of the vehicle, and a further movement of the pendulum 33 is effected, the plate 36 will be moved to a point at which the beam of light supplied by the light producing element 38a is permitted to impinge upon the light producing element 38 with the result that the winding 18 of the release magnet valve device will be energized and fluid will be vented from the brake cylinder 1 to the atmosphere, thereby releasing the brakes and checking the rate of retardation of the vehicle. The pendulum 33 will then tend to return to its normal position, thereby moving the plate 36 into the path of the light beam supplied by the light producing element 38a and effecting a deenergization of the winding of the magnet valve device 18 to cause this valve to close. On a further reduction in the rate of deceleration of the vehicle the pendulum 33 will move a greater distance towards its normal position with the result that the plate 36 will move to a point at which the beam of light supplied by the light producing element 37a is interrupted by the plate 36, thereby deenergizing the winding of the supply magnet valve 10 and allowing this valve to move to the open position so that fluid under pressure can flow from the reservoir 2 to the brake cylinder 1, providing the brake valve handle 5 has remained in its brake applying position, thus increasing the degree of application of the brakes and accordingly increasing the rate of deceleration of the vehicle.

However, if the rate of retardation of the vehilce should again be increased to too great a value, the pendulum 33 will again move away from its normal position due to the increased rate of retardation. This will again bring the plate 36 to a point at which it fails to interrupt the beams of light supplied by the light producing elements, and the light beams will again impinge upon the light responsive elements 37 and 38 so that these elements will again energize the magnet valve devices 10 and 18 to cut off the flow of fluid under pressure to the brake cylinder and permit the release of fluid from the brake cylinder.

The pendulum or inertia responsive element 33 is responsive to the rate of retardation of the vehicle and always operates at the same rate of retardation of the vehicle and by selecting a pendulum and light interrupting plate of proper proportions this rate of retardation may be selected for any given vehicle or traction vehicle so as not to cause wheel sliding.

In order to most effectively control the brake equipment it is desirable that the critical control positions of the control device be as sharply defined as possible, that is, that the energization or deenergization of the magnet valve devices be effected by relatively small movements of the inertia responsive member. In the control device provided by my invention the energization and deenergization of the magnet valve devices is controlled by the plate 36 which is movable on a relatively large radius as compared to the relatively small radius of the pendulum device 33 with the result that it is movable through relatively great distances in response to comparatively small changes in the rate of retardation of the vehicle. The beams of light supplied by the light producing elements 37a and 38a are focused by means of suitable lenses 39 so as to have focal points located substantially in the plane in which the plate 36 is movable, and the entire supply of light to the light responsive elements will be cut off as soon as the margin of the plate 36 is moved past the focal points of the light beams associated with the light responsive elements. Because of the relatively small amount of travel of the plate 36 which is required to move it across the comparatively small focal points of the light beams and, because of the relatively large amount of travel the plate 36 which is secured in response to movement of the pendulum element 33, it will be seen that the critical control positions of the control device provided by my invention are very sharply defined.

It has been found that with either a free swinging or a spring snubbed pendulum there is some undesired oscillation when the retardation rate of the pendulum is changed or as a result of road shock, and that these oscillations of the pendulum cause unnecessary and undesired opening and closing of the magnet valve devices. It is desirable, therefore, to provide means to damp or check the movement of the pendulum, particularly when it is in its critical or control position. In order to control the movement of the pendulum I provide a pair of permanent magnets 50 which are secured to the frame 30 in any desired manner, and which, as best shown in Figure 3, are substantially U-shaped and have pole pieces 51 and 52 which are located adjacent to the plane in which the plate 36 is movable, and which are adapted to produce a magnetic field in which the member 36 is movable. The magnets 50 may be constructed of any suitable material, but I prefer to use cobalt steel because of its excellent retentive properties, together with high flux density. The plate 36 may be constructed of any suitable electrically conducting material, such as aluminum, and is adapted upon movement into the magnetic fields produced by the magnets 50, to have currents produced therein which react with the flux of the magnetic field to oppose movement of the member 36, thereby opposing and controlling movement of the pendulum 33.

In the preferred embodiment of the control device provided by my invention the magnets 50 are positioned with respect to the plate 36 so that there is substantially no damping action on this plate within a limited zone of movement of the plate on either side of the normal position of the plate, but so that on movement of the plate to a point outside of this limited zone of movement, the damping action will be immediately effective. It will be seen also that because of the stepped outline of the margin of the plate 36 the area of the plate which is subject to the magnetic field is relatively small for a limited movement of the plate, but that on an increase in the amount of movement of the plate 36 there is an increase in the area of the plate which is moved into the magnetic field with the result that there will be an increase in the magnitude of the damping action. The arrangement of the magnets and the plate 36, therefore, is such that no restriction whatever is offered to movement of the pendulum at the start of its movement from its normal position, but that a slight damping action becomes effective before the first light responsive element is uncovered and that a heavy damping action is secured when both of the light responsive elements are uncovered, that is, when the pendulum is in the critical control position. Because of this damping action undesired oscillations of the pendulum are eliminated, and unnecessary and undesired opening and closing of the valve devices is also eliminated.

As is best shown in Figure 2 of the drawing, the plate 36 is preferably constructed so that it is substantially symmetrical, that is, so that the amount of movement which is required to move it from its normal position to a point at which it no longer interrupts the beams of light supplied by the light producing elements is substantially the same whichever direction the plate is moved from the normal position. This makes it possible to employ the retardation controller provided by this invention on vehicles which are operated in both directions as well as on vehicles which are operated in a forward direction only. When the retardation controller is installed on a vehicle which is operated in both directions the plate 36 will be moved in one direction as a result of retardation of the vehicle when operating in one direction and the plate 36 will be moved in the opposite direction as a result of retardation of the vehicle when operating in the other direction. The plate 36 will be moved to a point at which it no longer cuts off the beams of light supplied by the light producing elements after a certain amount of movement regardless of the direction of this movement.

It will be seen also that a pair of magnets 50 are provided and that the plate 36 is moved into the magnetic field produced by one of these magnets after a certain amount of movement in either direction away from the normal position. The damping means is operable, therefore, regardless of the direction in which the plate 36 is moved.

From the foregoing it will be seen that the retardation controller provided by my invention is extremely sensitive to changes in the rate of deceleration of the vehicle and that the inertia responsive means is entirely relieved of all mechanical work which restrict its movement. Further, it will be seen that means is provided to control or restrict undesired movement of the inertia responsive element when it is in its critical or control position, but that no restriction whatever is offered to the movement of this element at the start of this movement, and that the force exerted by this damping means is increased as the inertia responsive element moves away from its normal position. It will be seen also that the control device provided by my invention has very sharply defined critical or control positions, but that undesired opening and closing of the valve devices controlled thereby are eliminated.

While a preferred embodiment of the retardation controller provided by my invention has been illustrated and described in detail it should be understood that the invention is not limited to these details of construction, but that numerous changes and modifications can be made without departing from the scope of the following claims.

Having now described my invention, what I claim as new and desire to secure by Letters Patent, is:

1. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, and means responsive to inertia, said inertia responsive means being adapted when in different positions in its range of movement to vary the quantity of light supplied to the light responsive means.

2. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, means for focusing the light at a point intermediate the source of light and the light responsive means, and means responsive to inertia and movable in a plane substantially at the focal point of said light, said inertia responsive means being adapted when at different points in its range of movement to vary the quantity of light supplied to the light responsive means.

3. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, and means responsive to inertia and movable in a plane extending between the source of light and the means responsive to light, said inertia responsive means being adapted when at different points in its range of movement to vary the quantity of light supplied to the light responsive means.

4. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, and means responsive to inertia, said inertia responsive means being adapted when in different positions in its range of movement to vary the quantity of light supplied to the means responsive to the quantity of light supplied thereto, the means responsive to inertia comprising a pendulum movable on a relatively short radius and a member movable in accordance with the movement of the pendulum, said member being movable on a relatively long radius whereby it is movable a relatively large distance in response to a relatively small movement of the pendulum.

5. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, and means responsive to inertia, said inertia responsive means being adapted when in different positions in its range of movement to vary the quantity of light supplied to the light responsive means, the means responsive to inertia comprising a pendulum movable on a relatively short radius and a member movable in accordance with movement of the pendulum, said member being movable on a relatively long radius whereby it is movable a relatively large distance in response to a relatively small movement of the pendulum, said member being movable in a plane extending intermediate the source of light and the light responsive means.

6. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, means for focusing the light at a point intermediate the source of light and the light responsive means, and means responsive to inertia and comprising a pendulum movable on a relatively short radius and a member movable in accordance with movement of the pendulum, said member being movable on a relatively long radius whereby it is movable a relatively large distance in response to relatively small movement of the pendulum, said member being movable in a plane substantially at the focal point of said light.

7. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, and means responsive to inertia, said inertia responsive means being adapted when in different points in its range of movement to vary the quantity of light supplied to the light responsive means, means for producing a magnetic field, and a member movable in said magnetic field in accordance with movement of the means responsive to inertia, said member being constructed of electrically conducting material, whereby on movement of said member in said magnetic field currents are induced therein which react with the flux in the magnetic field to oppose movement of said member.

8. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, means responsive to inertia, said inertia responsive means being adapted when in different points in its range of movement to vary the quantity of light supplied to the light responsive means, the inertia responsive means having a normal position, means for producing a magnetic field, and a member movable in said magnetic field in accordance with movement of the means responsive to inertia, said member being constructed of electrically conducting material, whereby on movement of said member in said magnetic field currents are induced therein which react with the flux in the magnetic field to oppose movement of said member, said member and the means for producing the magnetic field being arranged so that the area of the member subject to the magnetic field increases the farther the inertia responsive means moves from its normal position.

9. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, means responsive to inertia, said inertia responsive means being adapted when in different points in its range of movement to vary the quantity of light supplied to the light responsive means, the inertia responsive means having a normal position, means for producing a magnetic field, a member movable in accordance with the movement of the inertia responsive means, said member being constructed of electrically conducting material and being disposed substantially outside of said magnetic field when said inertia responsive means is in its normal position, said member being movable in said magnetic field upon movement of the inertia responsive means away from its normal position and being adapted upon movement of said magnetic field to have currents produced therein and reacting with the flux of the magnetic field to oppose movement of the said member whereby movement of the inertia responsive means is opposed.

10. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, means responsive to inertia and adapted when in different points of its range of movement to vary the quantity of light supplied to the light responsive means, the inertia responsive means having a normal position, and means to control movement of the means responsive to inertia, said means being inoperable when the inertia responsive means is in a zone adjacent its normal position, and being operable upon movement of the inertia responsive means to a point outside said zone.

11. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, means responsive to inertia and being adapted when in different points in its range of movement to vary the quantity of light supplied to the light responsive means, the inertia responsive means having a normal position and being movable therefrom in response to changes in the rate of speed of the vehicle and being operable upon movement to a point outside a zone adjacent said normal position to effect a variation in the light supplied to the light responsive means operable to effect the circuit controlled thereby to actuate the means controlling the degree of application of the brake means.

12. In a vehicle brake apparatus, in combination, brake means, means for effecting an application of the brake means, a control circuit, a source of light, light responsive means responsive to variations in the quantity of light supplied thereto and adapted to control said circuit, means controlled by said circuit and operable to control the degree of application of the brake means, means responsive to inertia and being adapted when in different points in its range of movement to vary the quantity of light supplied to the light responsive means, the inertia responsive means having a normal position and being movable therefrom in response to changes in the rate of speed of the vehicle and being operable upon movement to a point outside a zone adjacent said normal position to effect a variation in the light supplied to the light responsive means operable to effect the circuit controlled thereby to actuate the means controlling the degree of application of the brake means, means for producing a magnetic field and a member movable in accordance with movement of the inertia responsive means, said member being movable in said magnetic field upon movement of the inertia responsive member to a point outside a zone adjacent its normal position, and being adapted upon movement in said magnetic field to have currents produced therein which react with the flux in the magnetic field to oppose movement of said member.

13. In a vehicle braking apparatus, in combination, brake means, means for effecting an application of the brake means, a control circuit, a pair of relatively movable members, light responsive means associated with one of said movable members, the other of said movable members being adapted to control the quantity of light supplied to the light responsive means, one of said members being responsive to inertia whereby it is movable responsive to changes in the rate of speed of the vehicle, and whereby the quantity of light supplied to the light responsive means varies, and means controlled by the light responsive means and operable to control the degree of application of the brake means.

14. In a vehicle braking apparatus, in combination, brake means, means for effecting an application of the brake means, a control circuit, a pair of relatively movable members, a source of light, light responsive means associated with one of said movable members, the other of said movable members being adapted to control the quantity of light supplied to the light responsive means by the source of light, one of said members being responsive to inertia whereby it is movable responsive to changes in the rate of speed of the vehicle and whereby the quantity of light supplied to the light responsive means varies, and means controlled by the light responsive means and operable to control the degree of application of the brake means.

15. In a vehicle braking apparatus, a brake cylinder, means for supplying fluid under pressure to said brake cylinder to apply the brakes, a pair of light responsive elements, each of said elements being operable in response to variations in the quantity of light supplied thereto, one of said light responsive elements controlling means operable to cut off the flow of fluid under pressure to the brake cylinder, the other of said light responsive elements controlling means to release fluid under pressure from the brake cylinder, a source of light, and an inertia responsive member movable in response to changes in the rate of speed of the vehicle and operable to vary the quantity of light supplied to the light responsive elements.

16. In a vehicle braking apparatus, a brake cylinder, means for supplying fluid under pressure to said brake cylinder to apply the brakes, a pair of light responsive elements, each of said elements being operable in response to variations in the quantity of light supplied thereto, one of said light responsive elements controlling means operable to effect cut off of the flow of fluid under pressure to the brake cylinder, the other of said light responsive elements controlling means to effect release of fluid under pressure from the brake cylinder, a source of light, an inertia responsive member movable in response to changes in the rate of speed of the vehicle and operable to vary the quantity of light supplied to the light responsive elements, the inertia responsive member having a normal position and being movable to a point to effect a variation in the supply of light to one of the light responsive elements upon movement to one point spaced from its normal position, and being movable to a point to effect a variation in the supply of light to the other of said light responsive elements upon movement to a point more distant from said normal position than said first named point.

17. In a vehicle braking apparatus, a brake cylinder, means for supplying fluid under pressure to said brake cylinder to apply the brakes, a pair of light responsive elements, each of said elements being operable in response to variations in the quantity of light supplied thereto, one of said light responsive elements controlling means operable to effect cut off of the flow of fluid under pressure to the brake cylinder, the other of said light responsive elements controlling means to effect release of fluid under pressure from the brake cylinder, a source of light, an inertia responsive member movable in response to changes in the rate of speed of the vehicle and operable to vary the quantity of light supplied to the light responsive elements, the inertia responsive member having a normal position and being movable to a point to effect a variation in the supply of light to the light responsive element controlling the means controlling the supply of fluid under pressure to the brake cylinder on movement to one point adjacent its normal position, and being movable to a point to effect a variation in the supply of light to the light responsive element controlling the means controlling the release of fluid under pressure from the brake cylinder upon movement to a point more distant from said normal position than said first named point.

18. In a vehicle braking apparatus, a brake cylinder, means for supplying fluid under pressure to said brake cylinder to apply the brakes, a pair of light responsive elements, each of said elements being operable responsive to variations in the quantity of light supplied thereto, a source of light associated with each of said light responsive elements, means for focusing the light for each of said elements at a point substantially in a plane located intermediate the source of light in the light responsive element associated therewith, one of said light responsive elements controlling means operable to effect cut off of the flow of fluid under pressure to the brake cylinder, the other of said light responsive elements controlling means to effect release of fluid under pressure from the brake cylinder, an inertia responsive member movable in response to changes in the rate of speed of the vehicle and operable to vary the quantity of light supplied to the light responsive elements, said member comprising means movable substantially in the plane of the focal points of the light supplied by said sources of light.

19. In a vehicle braking apparatus, a brake cylinder, means for supplying fluid under pressure to said brake cylinder to apply the brakes, a pair of light responsive elements, each of said elements being operable in response to variations in the quantity of light supplied thereto, one of said light responsive elements controlling means operable to cut off the flow of fluid under pressure to the brake cylinder, the other of said light responsive elements controlling means to release fluid under pressure from the brake cylinder, a source of light, an inertia responsive member movable in response to changes in the rate of speed of the vehicle and having a normal position, means movable in response to movement of the inertia responsive member and operable to vary the quantity of light supplied to the light responsive element, the means for controlling the supply of light to the light responsive elements comprising an electrically conducting member movable in a plane extending between the source of light and the light responsive elements, and means for producing a magnetic field adjacent said plane, a portion of said electrically conducting member being movable in said magnetic field on movement of the inertia responsive element away from its normal position whereby currents are induced in said member which react with the flux of the magnetic field to oppose movement of said member whereby movement of the inertia responsive means is opposed.

20. In a vehicle brake apparatus, in combination, brake means, means for effecting an application of the brake means, means responsive to inertia and comprising a pendulum movable on a relatively short radius and a member movable in accordance with movements of said pendulum, said member being movable on a relatively long radius, and means responsive to movements of said member and controlling the degree of application of the brake means.

21. In a vehicle braking means, in combination, brake means, means for effecting an application of the brake means, means comprising a member movable responsive to inertia and controlling the degree of application of the brake means, and means to control said inertia responsive member, said means being responsive to movements of said inertia responsive member and operable only upon movement of said member to oppose movement thereof.

22. In a vehicle braking means, in combination, brake means, means for effecting an application of the brake means, means comprising a member movable responsive to inertia and controlling the degree of application of the brake means, and means to control said inertia responsive member, said means comprising means for producing a magnetic field and a member constructed of electrically conducting material and movable in said magnetic field in accordance with movement of the member movable responsive to inertia, whereby on movement of said member in said magnetic field currents are induced therein which react with the flux of the magnetic field to oppose movement of said member.

23. In a vehicle brake apparatus, in combination, brake means, means for effecting an application of the brake means, means responsive to inertia and controlling the degree of application of the brake means, said means comprising a pendulum movable on a relatively short radius, and means to control movements of said pendulum, said means comprising means for producing a magnetic field, and a member constructed of electrically conducting material and movable in said magnetic field in accordance with movements of the pendulum, whereby on movement of said member in said magnetic field currents are induced therein which react with the flux in the magnetic field to oppose movement of said member, said member being movable on a relatively long radius whereby it is movable relatively large distances in response to relatively small movements of the pendulum.

24. In a vehicle braking apparatus, in combination, brake means, means for effecting an application of the brake means, means comprising a member movable responsive to inertia and controlling the degree of application of the brake means, and means to control said inertia responsive member, said means comprising a member operable on movement of said inertia responsive member to generate a force opposing movement of said inertia responsive member.

JOHN W. LOGAN, JR.